United States Patent Office 2,889,350
Patented June 2, 1959

2,889,350
METHODS OF PREPARING SYNTHETIC ORGANO SILICON CHLORIDES

Charles Horny and Maurice Guinet, Chatillon-sous-Bagneux, France, assignors to Office National d'Etudes et de Recherches Aeronautiques, Chatillon-sous-Bagneux (Seine), France, a society of France No Drawing. Application February 7, 1957
Serial No. 638,683

Claims priority, application France December 11, 1951

9 Claims. (Cl. 260—448.2)

The present invention relates to the preparation of synthetic organo-silicon chlorides and more particularly of alkylchlorosilanes and arylchlorosilanes.

The chief object of our invention is to provide a method of preparing such compounds which is quicker and more efficient than those known up to this time.

The reaction for preparing organo-silicon halides may be considered as the following one:

$$6RX + 3Si = RSiX_3 + R_2SiX_2 + R_3SiX$$

in which R is an alkyl or aryl radical and X a halogen. Furthermore, products such as $SiX_4$ and $R_4Si$ may be obtained, among others.

The proportions of the different organo-silicon halide compounds obtained are variable according to the conditions of operation, but, as a rule, it is desirable to obtain as high a percentage as possible of the symmetrical compound $R_2SiX_2$, because such compounds may be used for the preparation of liquid polysiloxanes, called "silicone oils."

According to our invention, an alkylchlorosilane or arylchlorosilane is obtained by effecting reaction between an alkyl or aryl chloride and a mixture of silicon with a catalyst constituted as follows: an aluminum salt and a copper salt are mixed together in respective proportions such that the mixture contains from 0.1 to 5 atoms of aluminium for one atom of copper. This mixture is treated by means of an alkaline hydroxide in proportions such that the final pH value of the reaction medium ranges from 5 to 9, preferably having a value close to 8. The coprecipitate thus formed is mixed with silicon in such proportions that the amount of silicon ranges from 10 to 90 percent of the total mass, and the whole is then reduced and activated by heating.

It should be well understood that our invention is applicable irrespective of the nature of the hydrocarbon radical to be included in the final synthetic product (methyl, phenyl, ethyl, etc.).

Owing to the above stated way of proceeding, the coprecipitate we obtain is made of compounds having a special crystalline structure differing from that of a mere mixture of the constituents; said compounds, when analyzed my means of X-rays, offer a spectrum definitely different from that which would be obtained with the constituents of the mixture.

It seems that said compounds, without being stoichiometric, are copper hydroaluminates.

The final heating will re-shape the materials according to a constitution particularly adapted to the formation of organo-silicon chlorides.

The manner of proceeding which has given the best results for the preparation of organo-silicon chlorides is first described hereunder.

The coprecipitate is such that it contains from 0.1 to 5 atoms of aluminium for one atom of copper. The copper and aluminium compounds are coprecipitated from a mixture of salts thereof (generally nitrates and preferably heated to boiling point) by means of an alkaline hydroxide; the ratio of the alkaline hydroxide to the copper and aluminium salts is adjusted so that the final pH ranges from 5 to 9 and, advantageously, is approximately equal to 8, so as to obtain a coprecipitate having a special crystalline structure. An amount of silicon equal to from 10 to 90% of the total mass is added. The whole is heated in the presence of a reducing gas, preferably hydrogen, at a temperature ranging from 700° to 900° C. (advantageously about 800° C.). The mass thus obtained is an active catalyst. This mass is cooled down in a stream of an inert gas, preferably nitrogen. When the temperature required for synthesis of the organo-silicon chloride is reached (from 250 to 600° C.), the alkyl or aryl chloride is placed in the presence of the contact mass. The reaction products are separated in any known manner.

An alternative method consists in subjecting the coprecipitate to a succession of alternate reductions and oxidations at temperatures decreasing from about 800° C. to about 450° C., then adding the amount of silicon corresponding to from 10 to 90% of the total mass (advantageously from 60 to 90%), subjecting the contact mass to a last reduction at a temperature lower than 250° C. and effecting the reaction with the alkyl or aryl chloride (at a temperature ranging from 250 to 600° C. according to the desired composition of the final product).

When the reaction is to be effected with a fluidized catalyst, the contact mass is ground into a fine powder in an inert atmosphere before flowing the same with the organic halide.

When the catalyst mass is exhausted, it may be regenerated by successive oxidations and reductions.

The silicon content of the mass thus regenerated is then restored to the original proportion by grinding the mass with silicon, the mass thus obtained being subjected to a last reduction in situ before being used for a new synthesis.

Specific examples are given hereunder.

It is to be noted that the starting salts used for coprecipitating the active mixture are given merely by way of example. Also the proportions indicated are illustrative and have no limitative character.

Example 1

We prepare a mixture of solutions of copper nitrate and aluminium nitrate at a concentration of 25% in distilled water, the molecular ratio of said salts being 1:0.5. Said mixture is poured slowly into a 15% caustic soda solution heated to boiling point and strongly stirred until a final pH of 8 is obtained. The resulting coprecipitate is carefully washed until any trace of nitrates has disappeared and until the pH is equal to 7. The excess of water is then squeezed out and the coprecipitate is dried in a suitable oven at a temperature not higher than 150° C. Said coprecipitate contains about 40% of copper by weight.

An amount of commercial silicon of 98.5% purity is then incorporated into the coprecipitate, said silicon having been sieved at 100 mesh, so as to obtain in the contact mass a proportion of copper of 18%. The contact mass is homogenized in a grinder. The powder is then compressed into pellets, and loaded into a tube to be placed in a suitable furnace.

The contact mass is treated in a hydrogen stream at a temperature which is raised to 800° C. and then maintained during at least 10 hours.

The hydrogen stream is then replaced by a nitrogen stream and the temperature is lowered to 250° C. Then the nitrogen stream is in turn replaced by a methyl chloride stream. The temperature is progressively raised to 320° C. as the activity of the gas decreases with time. The specific production per hour is equal to 60 g. of reaction products per litre of contact mass, the respective proportions of said products being:

70% of $(CH_3)_2SiCl_2$—dimethyldichlorosilane
6% of $(CH_3)_3SiCl$—trimethylchlorosilane
22% of $(CH_3)SiCl_3$—methyltrichlorosilane
2% of other substances.

Operating in the same manner, but adjusting the pH for coprecipitation at a value equal to 11, the specific production per hour drops to 50 g. of reaction products per litre of contact mass, the respective proportions of the products being:

59% of $(CH_3)_2SiCl_2$
0% of $(CH_3)_3SiCl$
35% of $(CH_3)SiCl_3$
6% of other substances.

It will be seen that, in the case, the yield is much lower due to the fact that the pH is not inside the above indicated range.

*Example 2*

Coprecipitation is effected as in Example 1. The coprecipitate, taken alone, is subjected to a succession of alternate oxidations and reductions: first, at 200° C. until no more water is formed, then, at 250° C. until the same condition is complied with.

The temperature is then raised, first by steps of 50° to 500° C., and then in a continuous manner to 800° C., this last temperature being maintained during several hours.

After blowing off by nitrogen, the catalyst is oxidized by means of air at 500° C. during a few hours, whereupon the temperature is lowered to 200° C.

A second hydrogen reduction is then effected while progressively raising the temperature to 450° C. This second reduction is followed by a new oxidation by means of air during several hours at 450° C. and, then, at a temperature decreasing to room temperature.

An amount of commercial silicon of a purity of 98.5% sieved at 200 mesh is incorporated to the product so as to obtain a proportion of copper of 16% in the contact mass.

The treatment is then completed as in Example 1.

The results are analogous to those of Example 1, the total yield of products being equal to 80 g. of products per litre of contact mass.

In the preceding examples, the reaction between the alkyl chloride and the silicon contained in the contact mass was effected in gaseous phase, by causing a stream of alkyl chloride in gaseous form to flow along the contact mass.

But non volatile aryl chlorides may also be made to react with the silicon contained in the contact mass, in a closed vessel, in the liquid phase under pressure. We will give an example of such a method in which the aryl radical is benzene.

*Example 3*

In an autoclave of 1000 cubic centimeters, provided with a stirring device, we place 200 gr. of the contact mass made as described in Example 1. This mass is in the powder form. In this autoclave, it is then subjected to a last reduction in situ by means of hydrogen, at approximately 300° C. After cooling, we introduce into the autoclave 440 gr. of monochlorobenzene $C_6H_5Cl$. The autoclave is closed and heated up to 320–330° C., while stirring. The pressure rises to about 18 kgs. per sq. cm. The temperature is maintained, while stirring, for about 50 hours. The reaction products are separated by fractional distillation.

About 98.6% of the monochlorobenzene placed in the autoclave is transformed. The respective proportions of the reaction products are as follows:

| | Percent |
|---|---|
| $(C_6H_5)SiCl_3$ | 41.8 |
| $(C_6H_5)_2SiCl_2$ | 36.0 |
| $(C_6H_5)_3SiCl$ | 13.7 |
| Residues | 8.5 |

Of course, the above numerical indications are given merely by way of example. As a rule, the reaction takes place for treatment temperatures ranging from 180 to 350° C. But the preferred temperature range is from 300 to 340° C.

The present application is a continuation-in-part of our prior application Ser. No. 324,836, filed December 8, 1952, for "Process for Manufacturing Synthetic Halogenated Organo-Silicon Compounds," now abandoned.

What we claim is:

1. The method of producing an organo-silicon chloride which comprises reacting a member of the group consisting of lower alkyl chlorides and aryl chlorides with a mixture of silicon and the coprecipitate resulting from the action of an alkaline hydroxide upon an aluminium salt and a copper salt mixed together in respective proportions such that the mixture contains from 0.1 to 5 atoms of aluminium for one atom of copper, the amount of alkaline hydroxide being such as to give the final pH a value ranging from 5 to 9, said mixture of silicon and coprecipitate, in which the amount of silicon ranges from 10 to 90 percent of the total mass, being activated by heating before reaction with the chloride.

2. The method of producing an organo-silicon chloride which comprises reacting a member of the group consisting of lower alkyl chlorides and aryl chlorides with a mixture of silicon and the coprecipitate resulting from the action of an alkaline hydroxide upon an aluminium salt and a copper salt mixed together in respective proportions such that the mixture contains from 0.1 to 5 atoms of aluminium for one atom of copper, the amount of alkaline hydroxide being such as to give the final pH a value ranging from 5 to 9, said mixture of silicon and coprecipitate, in which the amount of silicon ranges from 10 to 90 percent of the total mass, being heated at a temperature ranging from 700 to 900° C. in a gaseous reducing medium before reaction with the chloride.

3. The method of producing an organo-silicon chloride which comprises passing, at a temperature ranging from 250 to 600° C., a stream of a member from the group consisting of lower alkyl chlorides and aryl chlorides over an aluminium and copper complex precipitate obtained from a mixture of an aluminium salt and a copper salt in respective proportions such that the mixture contains from 0.1 to 5 atoms of aluminium for one atom of copper, said precipitate being obtained by coprecipitation by means of an alkaline hydroxide of the class consisting of sodium and potassium, the amount of said alkaline hydroxide being such as to give the final pH a value ranging from 5 to 9, adding to the coprecipitate thus obtained an amount of silicon ranging from 10 to 90 percent of the total mass, heating said mass in the presence of a reducing gas at a temperature ranging from 700 to 900° C., and cooling said mass in a stream of an inert gas down to the above stated temperature at which it is treated by the stream of chloride.

4. The method of producing an organo-silicon chloride which comprises passing, at a temperature ranging from 250 to 600° C., a stream of a member of the group consisting of lower alkyl chlorides and aryl chlorides over an aluminium and copper complex precipitate obtained from a mixture of an aluminium salt and a copper salt in respective proportions such that the mixture contains from 0.5 to 1 atom of aluminium for one atom of copper, said precipitate being obtained by coprecipitation by means of an alkaline hydroxide of the class consisting of sodium and potassium, the amount of said alkaline hydroxide being such as to give the final pH a value substantially equal to 8, adding to the coprecipitate thus obtained an amount of silicon ranging from 60 to 90 percent of the total mass, heating said mass in the presence of a reducing gas at a temperature substantially equal to 800° C., and cooling said mass in a stream of an inert gas down to the above stated temperature at which it is treated by the stream of chloride.

5. The method of producing an organo-silicon chloride which comprises passing, at a temperature ranging from 250 to 600° C., a stream of a member of the group consisting of lower alkyl chlorides and aryl chlorides over an aluminium and copper complex precipitate obtained from a mixture of an aluminium salt and a copper salt in respective proportions such that the mixture contains from 0.1 to 5 atoms of aluminium for one atom of copper, said precipitate being obtained by coprecipitation by means of an alkaline hydroxide of the class consisting of sodium and potassium, the amount of said alkaline hydroxide being such as to give the final pH a value ranging from 5 to 9, subjecting the coprecipitate thus obtained to a series of successive gaseous reductions and oxidations at temperatures decreasing from about 800° C. to about 450° C., adding to the mass thus obtained an amount of silicon ranging from 10 to 90 percent of the total mass, and treating said mass by means of a stream of a reducing gas at a temperature lower than 250° C.

6. The method of producing an organo-silicon chloride which comprises placing in an autoclave on the one hand a mixture of silicon with the coprecipitate resulting from the action of an alkaline hydroxide upon an aluminium salt and a copper salt mixed together in respective proportions such that the mixture contains from 0.1 to 5 atoms of aluminium for one atom of copper, the amount of alkaline hydroxide being such as to give the final pH a value ranging from 5 to 9, said mixture of coprecipitate, in which the amount of silicon ranges from 10 to 90 percent of the total mass, being activated by heating, and on the other hand a non volatile liquid aryl chloride, closing the autoclave and heating it at a temperature ranging from 180 to 350° C. for several hours.

7. The method according to claim 6 in which said second-mentioned heating is performed at a temperature ranging from 300 to 340° C.

8. The method according to claim 6 in which the mixture of silicon and coprecipitate is heated at a temperature averaging 300° C. in the presence of hydrogen in said autoclave, before mixing it with said aryl chloride.

9. The method according to claim 6 in which said aryl chloride consists of monochlorobenzene, the second-mentioned heating being conducted at 320–330° C.

References Cited in the file of this patent

UNITED STATES PATENTS

| | | |
|---|---|---|
| 2,427,605 | Hurd | Sept. 16, 1947 |
| 2,759,960 | Nishikawa et al. | Aug. 21, 1956 |

FOREIGN PATENTS

| | | |
|---|---|---|
| 1,046,295 | France | July 8, 1953 |